United States Patent [19]

Taima

[11] Patent Number: 4,841,601
[45] Date of Patent: Jun. 27, 1989

[54] HINGE DEVICE WITH TRANSVERSE SLOTS
[75] Inventor: Hajime Taima, Sagamihara, Japan
[73] Assignee: Nifco Inc., Yokohama, Japan
[21] Appl. No.: 269,781
[22] Filed: Nov. 10, 1988
[30] Foreign Application Priority Data Dec. 2, 1987 [JP] Japan .................. 62-182978

[51] Int. Cl.$^4$ ................................. E05D 15/06
[52] U.S. Cl. ........................ 16/361; 312/322
[58] Field of Search ........... 16/361, 345, 363, 306,
16/307, 376, 357, 360; 312/322, 323

[56] References Cited

U.S. PATENT DOCUMENTS 4,386,450  6/1983  Krauss .......................... 16/361

FOREIGN PATENT DOCUMENTS 1037861  5/1953  France ........................... 16/361

Primary Examiner—Nicholas P. Godici
Assistant Examiner—Carmine Cuda
Attorney, Agent, or Firm—Richard Bushnell

[57] ABSTRACT

A device for opening and closing a door hinged to a body includes a pair of bearing recesses formed in a face-to-face relation to each other in opposed inner wall surfaces of the body, bearing pieces rotatably accommodated one each in the bearing recesses, a pair of pivotable pieces provided one of each edge of the door at one end thereof and fitted in the bearing grooves, and a pair of guide grooves formed in a face-to-face relation to each other in the opposed inner wall surfaces of the body and each having one end communicating with one of the bearing recesses and extending inwardly of the body from the bearing recess. Each of the bearing recesses has a surface facing the other bearing recess and having a radial bearing groove extending from the axial center. The door is rotatably supported in the bearing recesses via the bearing pieces. When the door is opened, the guide grooves communicate with the bearing recesses. The pivotable pieces can be moved along the guide grooves to accommodate the door into the body.

1 Claim, 3 Drawing Sheets

HINGE DEVICE WITH TRANSVERSE SLOTS

BACKGROUND OF THE INVENTION

1. Field of the Invention

This invention relates to a device for opening and closing a door such as a door of an audio apparatus control box or a door in an automobile dashboard. More particularly, the invention concerns a door opening/closing device, with which the door is opened and closed in such a manner that it is rotated about pivotal sections provided at the ends of its opposite side edges and that after being opened, it can be accommodated in a cabinet of the apparatus or the like.

2. Prior Art Statement

When a door having a hinged end is opened, it is projected forwardly or backwardly from the opening of a cabinet or the like. In the case where such a door is of a type accommodated in the cabinet opening in an upright manner at its closed position, when it is intended to open the door, the hinged end of the door will strike the edge of the cabinet opening and the door will be held in a horizontally projecting state with the hinged end of the door supported on the edge of the cabinet opening.

Where the door is horizontally projected or hangs down in its open state, it will become an obstacle in the case where a control knob or the like provided on the inner side of the cabinet opening is to be operated. In addition, it will spoil the appearance of the apparatus in use.

OBJECT AND SUMMARY OF THE INVENTION

The present invention has been made in view of the above fact that a door which projects outwardly from the cabinet opening or hangs down when it is opened, constitutes an obstacle in various operations or spoils the appearance of apparatus, and its primary object is to avoid the door being held projected when it is opened. More particularly, the invention has an object of providing a device for opening and closing a door, which permits the door, after being opened, to be accommodated in the cabinet body or the like by pushing it edgewise into the cabinet, instead of removing it from the cabinet opening, so that it will not constitute an obstacle in various operations and also permits the door accommodated in the cabinet to be pulled out edgewise from the cabinet and then turned about its pivotal point to close the opening.

To attain the above object of the invention, there is provided a device for opening and closing a door, which comprises a pair of bearing recesses formed in a face-to-face relation to each other in opposed inner wall surfaces of a body to which a door is hinged, bearing pieces rotatably accommodated one each in the bearing recesses and having a surface facing the other with a radial bearing groove extending from the axial center, a pair of pivotable pieces provided one on each edge of the door at one end thereof and fitted in the bearing grooves so that the door is rotatably supported in the bearing recesses via the bearing pieces, and a pair of guide grooves formed in a face-to-face relation to each other in the opposed inner wall surfaces of the body and each having one end communicating with one of the bearing recesses and extending inwardly of the body from the bearing recess, the guide grooves being communicated with the bearing recesses when the door is opened, whereby the pivotable pieces of the door can be moved along the guide grooves to accommodate the door into the body.

The above and other objects and features of the invention will become more apparent from the following detailed description with reference to the accompanying drawings.

DETAILED DESCRIPTION OF THE PREFERRED EMBODIMENT

Figure 1:
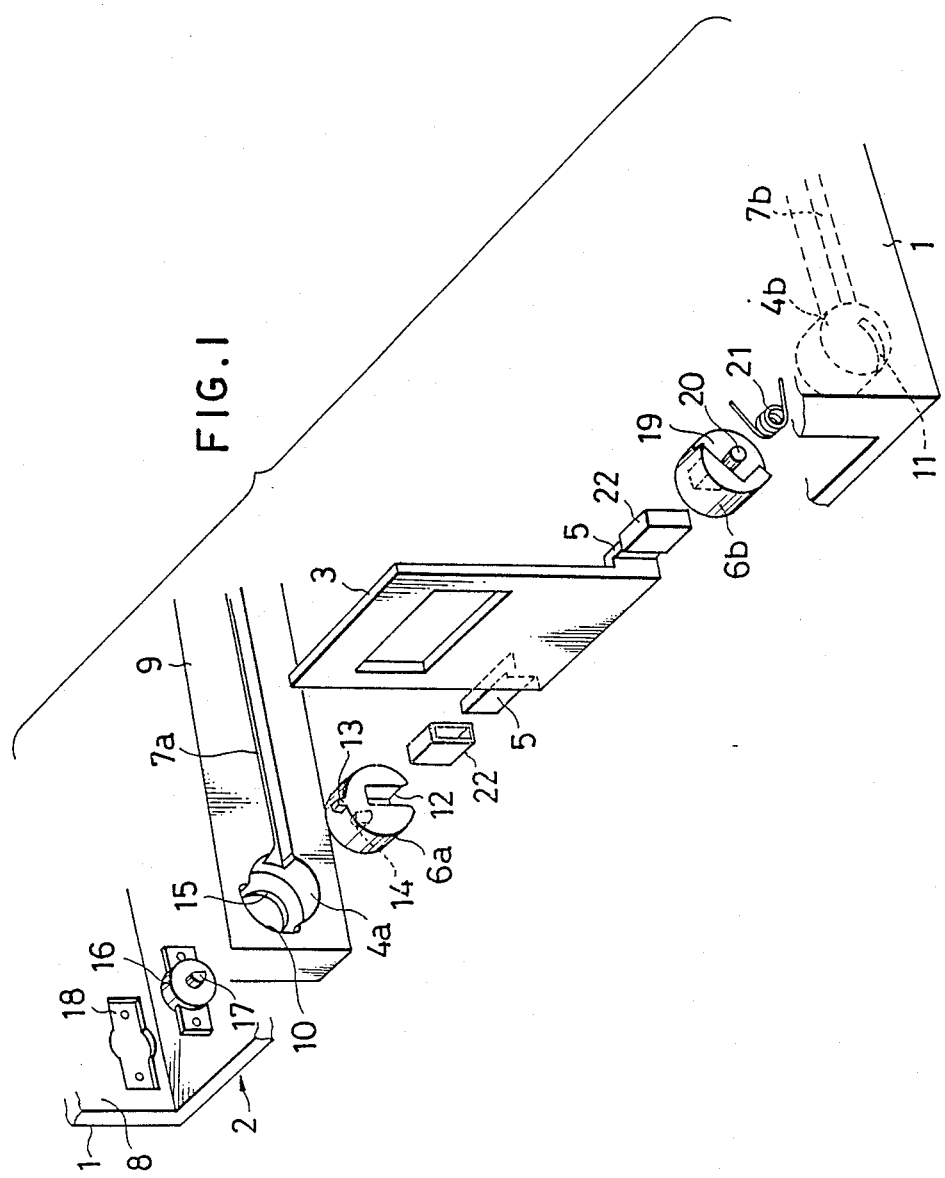
FIG. 1 is an exploded perspective view showing an embodiment of the device for opening and closing a door according to the invention.

The drawings illustrate an embodiment of the device for opening and closing a door according to the invention. Referring to the Figures, reference numeral 1 designates a cabinet body of an audio apparatus. The cabinet has a control knob box opening 2 opened and closed by a door 3, which is supported by the device according to the invention.

Reference numerals 4a and 4b designate bearing recesses for receiving pivotable portions 5 provided at the ends of opposite edges of the door 3; 6a and 6b designate bearing pieces via which the pivotable portions 5 are accommodated in the bearing recesses 4a and 4b; and 7a and 7b designate guide grooves communicating with the respective bearing recesses 4a and 4b.

In this embodiment, the bearing recess 4a and guide groove 7a are formed in a auxiliary plate 9 provided in contact with an inner wall surface 8 of the body 1 and having a predetermined thickness to facilitate assembly. It is possible, however, to form the bearing recess 4a and guide groove 7a in the inner wall surface 8 itself.

The bearing recesses 4a and 4b have the shape of a true circle and are located in face-to-face relation to each other on the inner side of the opening 2. The bearing recess 4a has its peripheral wall formed with an arcuate notch 10 subtending an angle of substantially 90 degrees. The other bearing recess 4b is provided with a notch 11 for receiving a spring.

The guide grooves 7a and 7b communicate at one end with the respective bearing recesses 4a and 4b and extend horizontally inwardly of the opening 2.

When the door 3 is accommodated, its pivotable portions 5 are guided along the guide grooves 7a and 7b for accommodating the door entirely. To meet this end, the guide grooves 7a and 7b have a length corresponding to the height of the door.

Each bearing piece 6a, 6b has a circular shape so that it can be snugly fitted in the bearing recesses 4a, 4b. The surface of each facing the other bearing piece is formed with a radial bearing groove 12 for receiving the pivotable portion 5.

The bearing groove 12 has a depth and a width sufficient to slidably receive the pivotable portion 5. The depth and width of the bearing groove 12 are also respectively made equal to the depth and width of the guide groove 7a, 7b communicating with the bearing recess 4a, 4b, so that each bearing groove 12 is aligned with the associated guide groove 7a, 7b when its orientation is aligned thereto with the rotation of the bearing piece. In this embodiment, the bearing piece 6a has its outer periphery formed with a projection 13, which can be slidably received in the notch 10 noted above to define a range of rotation. Further, the bearing piece 6a has its back side surface formed in a central portion thereof with a shaft insertion bore 14. A damper 16 is coupled to the bearing piece 6a with its shaft 17 inverted coupled to the shaft insertion bore 14 via a window 15 formed in the bottom of the bearing recess 4a, so that it can damp the rotation of the door. The damper 16 is securely mounted in a mounting section 18 provided in the inner wall surface 8 of the body 1.

The other bearing piece 6b has its back side surface formed with a notch 19 and an axial projection 20 extending from the bottom of the notch 19. A torsion spring 21 is fitted on the projection 20, and it is held compressed with one end in contact with the surface of the notch 19 and the other end in contact with the surface of the notch 11 of the bearing recess 4b. The spring 21 thus rotationally biases the bearing piece 6b in one direction (i.e., a direction of opening the door).

Reference numeral 22 designates a slide-assisting member or cap fitted on each pivotable portion 5 of the door to assist the sliding of the pivotable portion in each of the guide grooves 7a and 7b.

In assembling this embodiment of the door opening/closing device, the damper 16 is first installed on the inner wall surface 8 of the body 1, and then the auxiliary plate 9 is held in contact with the wall surface 8. At this time, the bearing pieces 6a and 6b having the pivotable portions 5 of the door 3 fitted therein are fitted in the bearing recess 4a of the auxiliary plate 9 and the bearing recess 4b of the body 1, respectively and the auxiliary plate 9 is then inserted into the opening 2 of the body 1 and secured to the body 1 by suitable means such as set screws.

The door 3 which is assembled in this way in the opening 2 is rotatably supported in the bearing recesses 4a and 4b via the bearing pieces 6a and 6b, and it can be opened and closed with the rotation of the bearing pieces 6a and 6b.

Figure 2:
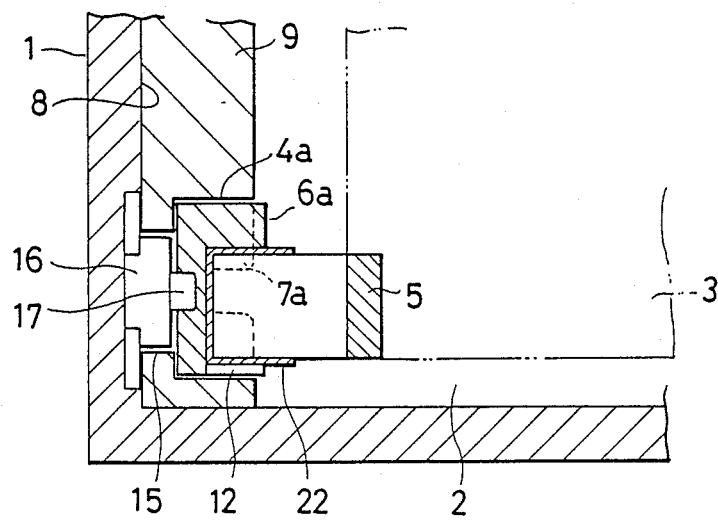
FIG. 2 is an elevational sectional view, to an enlarged scale, showing an essential part of the device shown in FIG. 1 when the door is closed.
Figure 3:
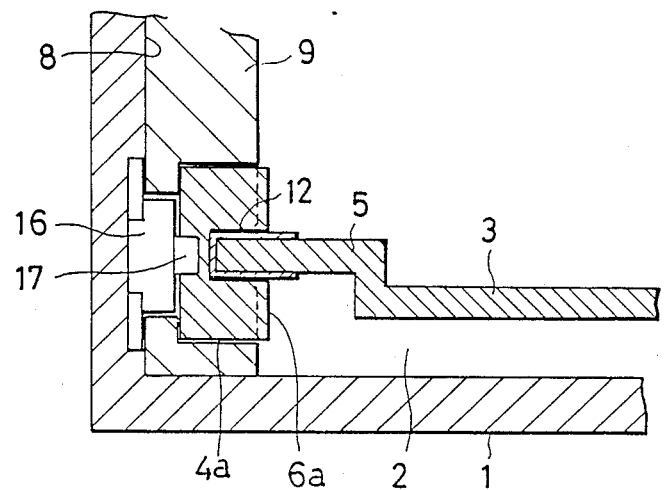
FIG. 3 is a view similar to FIG. 2 but showing the device of FIG. 1 when the door is opened.
Figure 4A:
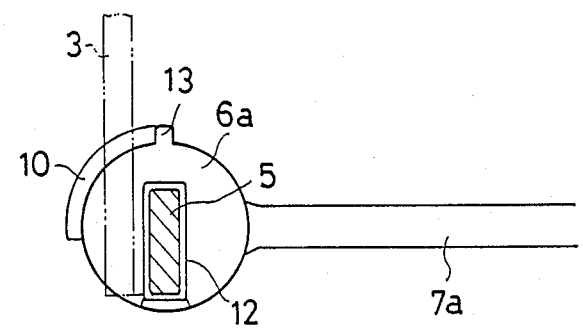
FIG. 4A to 4D are views for explaining the relation between a bearing groove and a guide groove with the rotation of a bearing piece caused with opening and closing motions of the door, with FIG. 4A showing the relation when the door is closed, FIG. 4B showing the relation when the door is being opened, FIG. 4C showing the relation when the door is opened and FIG. 4D showing the relation when the door is being accommodated.
Figure 4B:
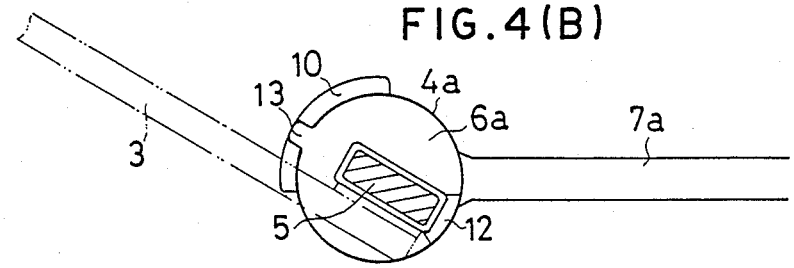
Figure 4C:
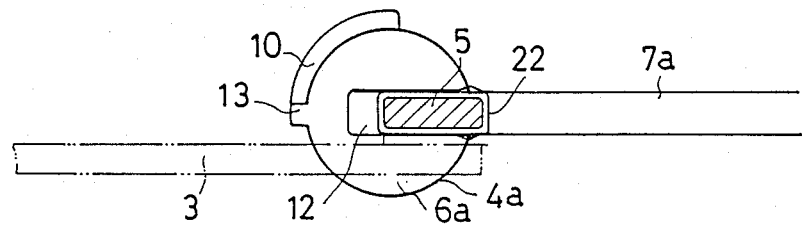
Figure 4D:
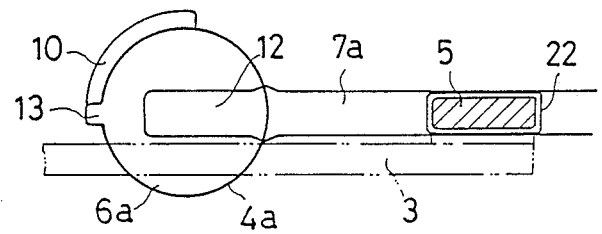

FIG. 2 shows the bearing piece 6a when the door 3 is closed, and FIG. 3 shows the bearing piece 6a when the door is opened.

In this embodiment, each pivotable portion 5 is plate-like and aligned with the associated bearing groove 12. Thus, the bearing pieces can be rotated in unison with the door.

When the door 3 is upright and closing the opening 2 as shown in FIG. 2, the pivotable portion 5 is upright, and the bearing groove 12 of the bearing piece 6a extends vertically with its open end closed by the peripheral wall of the bearing recess 4a. In this state, the pivotable portion 5 cannot be detached and is held at a fixed position in the bearing groove 12. This state is maintained while the open end of the bearing groove 12 is closed by the peripheral wall of the bearing recess 4a. As the door is opened, the bearing piece is turned, and the bearing groove 12 is brought to be oriented horizontally.

FIG. 3 shows this state, in which the door 3 is opened horizontally. In this state, the bearing groove 12 is horizontal and is communicated with the horizontally extending guide grooves 7a (7b).

Thus, by pushing the door 3 in this horizontal state into the cabinet body 1, the pivotable portions are moved along the guide grooves 7a and 7b, and the door 3 can be accommodated in the body 1.

FIGS. 4A to 4D illustrate the change in the orientation of the bearing groove 12 with the rotation of the bearing piece 6a in the bearing recess 4a caused with the rotation of the pivotable portion 5 as the door 3 is opened, and also illustrate the movement of the pivotable portion 5 along the guide groove 7a to guide the door 3 into the body 1 as the door is pushed after completion of the communication of the bearing groove 12 with the guide groove 7a.

In this embodiment, the door 3 is biased by the torsion spring 21 in the direction of opening it. Therefore, it is necessary to hold the door in the closed state with a suitable catcher. When opening the door, the catcher is released. When the door 3 is opened to the horizontal state the projection 13 strikes one end surface of the notch 10, so that the bearing grooves 12 and guide grooves 7a and 7b are automatically aligned. By subsequently pushing the door in this state into the body, it can be accommodated in the body.

The door 3 is closed by reversing the procedure described above. More specifically, the door 3 is first pulled out from the body 1 and is then turned to be upright. By this, the door 3 is closed with the rotation of the bearing pieces 6a and 6b.

As has been described in the foregoing in connection with the embodiment, with the device according to the invention the door 3 is rotatably supported in the bearing recesses 4a and 4b via the bearing pieces 6a and 6b receiving its pivotable portions 5. Thus, the door can be opened and closed by causing rotation of the bearing pieces. In addition, the door projecting from the opening of the cabinet body after being opened can be accommodated in the body by pushing it in the horizontally projecting state into the body, so that it can no longer constitute an obstacle for various operations in case where control knobs are provided inside the cabinet opening. Nor does it hang down, so that satisfactory appearance of the apparatus can be maintained.

Further, as described in connection with the above embodiment, according to the invention it is possible to incorporate a damper, so that the invention can be effectively utilized for a door of an audio apparatus or a door of a tape cassette deck.

What is claimed is:

1. A device for opening and closing a door, comprising a pair of bearing recesses formed in a face-to-face relation to each other in opposed inner wall surfaces of a body to which a door is hinged, bearing pieces rotatably accommodated one each in said bearing recesses and having a surface facing the other with a radial bearing groove extending from the axial center, a pair of pivotable pieces provided one on each edge of said door at one end thereof and fitted in said bearing grooves so that said door is rotatably supported in said bearing recesses via said bearing pieces, and a pair of guide grooves formed in a face-to-face relation to each other in said opposed inner wall surfaces of said body and each having one end communicating with one of said bearing recesses and extending inwardly of said body from said bearing recess, said guide grooves being communicated with said bearing recesses when said door is opened, whereby said pivotable pieces of said door can be moved along said guide grooves to accommodate said door into said body.

* * * * *